(12) United States Patent
Yoon

(10) Patent No.: US 10,433,201 B2
(45) Date of Patent: Oct. 1, 2019

(54) METHOD FOR TRANSMITTING AND RECEIVING PACKET IN TRANSPORT NETWORK

(71) Applicant: Electronics and Telecommunications Research Institute, Daejeon (KR)

(72) Inventor: Byung Sik Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 15/921,854

(22) Filed: Mar. 15, 2018

(65) Prior Publication Data

US 2018/0270692 A1    Sep. 20, 2018

(30) Foreign Application Priority Data

Mar. 17, 2017  (KR) ........................ 10-2017-0033761
Mar. 17, 2017  (KR) ........................ 10-2017-0033938

(51) Int. Cl.
*H04W 24/10*       (2009.01)
*H04L 1/00*        (2006.01)
(Continued)

(52) U.S. Cl.
CPC .......... *H04W 24/10* (2013.01); *H04B 7/0626* (2013.01); *H04L 1/0001* (2013.01); *H04L 1/0026* (2013.01); *H04L 1/18* (2013.01); *H04L 5/0053* (2013.01); *H04L 5/0057* (2013.01); *H04L 5/0091* (2013.01); *H04L 29/0653* (2013.01); *H04L 45/00* (2013.01); *H04L 69/22* (2013.01); *H04L 69/321* (2013.01); *H04L 1/0017* (2013.01)

(58) Field of Classification Search
None
See application file for complete search history.

(56) References Cited

U.S. PATENT DOCUMENTS

2010/0189045 A1    7/2010  Takeshita et al.
2014/0330887 A1*  11/2014  Gilberton .............. H04L 47/196
                                                          709/202
(Continued)

FOREIGN PATENT DOCUMENTS

KR    10-1516414 B1     5/2015
KR    10-2016-0039382 A  4/2016
(Continued)

*Primary Examiner* — Christine T Duong
(74) *Attorney, Agent, or Firm* — Rabin & Berdo, P.C.

(57) ABSTRACT

An operation method of a controller in a transport network supporting communications between an access network and a core network may comprise transmitting a request message for requesting a channel state report to at least one transport node among a plurality of transport nodes included in the transport network; receiving, in response to the request message, a response message including channel state information from the at least one transport node; determining at least one protocol layer to be used in the at least one transport node based on the channel state information; and transmitting a control message including information on the determined at least one protocol layer to the at least one transport node.

20 Claims, 8 Drawing Sheets

(51) Int. Cl.
*H04L 29/06* (2006.01)
*H04B 7/06* (2006.01)
*H04L 5/00* (2006.01)
*H04L 29/08* (2006.01)
*H04L 12/701* (2013.01)
*H04L 1/18* (2006.01)

(56) References Cited

U.S. PATENT DOCUMENTS

| | | |
|---|---|---|
| 2014/0376406 A1 | 12/2014 | Kim et al. |
| 2015/0092698 A1* | 4/2015 | Seo ....................... H04L 1/0026 370/329 |
| 2015/0350085 A1 | 12/2015 | Soumiya et al. |
| 2016/0019086 A1 | 1/2016 | Lee et al. |
| 2016/0028603 A1 | 1/2016 | Chakrabarti et al. |
| 2016/0134527 A1 | 5/2016 | Kwak et al. |
| 2016/0254984 A1 | 9/2016 | Tekalp et al. |
| 2016/0261456 A1 | 9/2016 | Yoon |
| 2016/0285742 A1 | 9/2016 | Sella et al. |
| 2016/0308755 A1 | 10/2016 | Garg |
| 2016/0315847 A1 | 10/2016 | Zhang et al. |
| 2016/0323182 A1 | 11/2016 | Segal |
| 2016/0366632 A1 | 12/2016 | Cui et al. |
| 2016/0380873 A1 | 12/2016 | Kanonakis et al. |
| 2017/0006499 A1 | 1/2017 | Hampel et al. |
| 2018/0234204 A1* | 8/2018 | Nammi ................... H04L 1/001 |

FOREIGN PATENT DOCUMENTS

| | | |
|---|---|---|
| KR | 10-1664436 B1 | 10/2016 |
| KR | 10-1668426 B1 | 10/2016 |

* cited by examiner

METHOD FOR TRANSMITTING AND RECEIVING PACKET IN TRANSPORT NETWORK

CROSS-REFERENCE TO RELATED APPLICATIONS

This application claims priorities to Korean Patent Applications No. 10-2017-0033761 filed on Mar. 17, 2017 and No. 10-2017-0033938 filed on Mar. 17, 2017 in the Korean Intellectual Property Office (KIPO), the entire contents of which are hereby incorporated by reference.

BACKGROUND

1. Technical Field

The present disclosure relates to a technique for transmitting and receiving packets, and more specifically, to a technique for configuring and controlling a communication path and at least one protocol layer for transmitting and receiving packets in a transport network.

2. Related Art

As mobile traffics increase enormously due to the increase of mobile communication subscribers and the spread of smart phones, it is becoming difficult to handle the increased traffics through existing communication networks (e.g., communication networks using limited radio resources). In order to solve such the problem, a small cell technology or the like may be introduced into a communication network. When the small cell technology is introduced to a communication network, mobile packets can be efficiently processed due to a decrease in cell coverage and an increase in the number of cells per unit area.

However, as the number of cells increases, the number of packets transmitted from a core network (or, a service network) to the cell also increases. Therefore, a transport network for efficiently transmitting the increased packets is required. In particular, a transport network for efficiently transmitting and receiving packets in a fronthaul, a midhaul, and a backhaul in a cloud-radio access network (C-RAN) will be required. The transport network may be referred to as an 'Xhaul transport network' or a 'crosshaul transport network'.

The transport network may support communications between a base station (or a radio unit (RU), a remote radio head (RRH), etc.) and a core network (or a base band unit (BBU), and may include a plurality of transport nodes (TNs) for transmitting packets to the base station and the core network. Here, the BBU may also be a BBU pool. The communications between the TNs included in the transport network may be performed using wired communication technologies (e.g., optical communication technology, Ethernet technology, etc.) or wireless communication technologies (e.g., millimeter wave (mmWave) communication technologies). Meanwhile, when a packet is transmitted to the base station or the core network through a plurality of transport nodes in the transport network, a transmission delay may occur.

The communication path control in a transport network (hereinafter referred to as a 'wired transport network') where a wired communication technology is used may be generally performed by a centralized flow control protocol based on software defined network (SDN) technologies. In a transport network (hereinafter referred to as a 'wireless transport network') where a wireless communication technology is used, the communication path control may be technically different from the communication path control in the wired transport network. Thus, when a communication path determination method defined for the wired transport network is used to determine an optimal communication path in the wireless transport network, it may be difficult to determine an optimal communication path.

SUMMARY

Accordingly, embodiments of the present disclosure provide a method for configuring a communication path and a protocol layer for transmitting and receiving packets in a transport network.

Also, embodiments of the present disclosure provide a method for searching and determining an optimal communication path in a transport network based on a wired or wireless communication technology.

In order to achieve the objective of the present disclosure, an operation method of a controller in a transport network supporting communications between an access network and a core network may comprise transmitting a request message for requesting a channel state report to at least one transport node among a plurality of transport nodes included in the transport network; receiving, in response to the request message, a response message including channel state information from the at least one transport node; determining at least one protocol layer to be used in the at least one transport node based on the channel state information; and transmitting a control message including information on the determined at least one protocol layer to the at least one transport node.

The operation method may further comprise receiving a report message including information on a source and a destination of a packet from a first transport node connected to the access network or a second transport node connected to the core network among the plurality of transport nodes, wherein the report message is received before the transmission of the request message.

The report message may further include a result of a deep packet inspection (DPI) on the packet.

The first transport node may support at least one communication protocol used by the access network and a common communication protocol used by the transport network, and the second transport node may support at least one communication protocol used by the core network and the common communication protocol.

The operation method may further comprise determining a communication path of the packet based on the information included in the report message and the response message, wherein the communication path is determined before the transmission of the control message, and the control message may further include information on the determined communication path.

The communication path may be determined based on a transmission speed and a delay time required for transmission of the packet.

The at least one protocol layer may be determined to be a physical (PHY) layer when a channel state indicated by the channel state information is equal to or larger than a predetermined threshold.

The at least one protocol layer may be determined to be a physical (PHY) layer, a medium access control (MAC) layer, and a radio link control (RLC) layer when a channel state indicated by the channel state information is less than a predetermined threshold.

In order to achieve the objective of the present disclosure, an operation method of a transport node in a transport network supporting communications between an access network and a core network may comprise receiving a request message for requesting a channel state report from a controller controlling the transport network; measuring a channel state based on the request message; transmitting a response message including a channel state information including the measure channel state; receiving, from the controller, a control message indicating at least one protocol layer determined based on the channel state information; and performing communications using the at least one protocol layer indicated by the control message.

The control message may further include information on a communication path determined by the controller, and the at least one protocol layer may be used for communications with another transport node indicated by the communication path.

When a channel state indicated by the channel state information is equal to or larger than a predetermined threshold, the at least one protocol layer may be determined to be a physical (PHY) layer, and the communications may be performed using the PHY layer.

When a channel state indicated by the channel state information is less than a predetermined threshold, a physical (PHY) layer, a medium access control (MAC) layer, and a radio link control (RLC) layer are determined to be the at least one protocol layer, and the communications may be performed using the PHY layer, the MAC layer, and the RLC layer.

In order to achieve the objective of the present disclosure, a controller in a transport network supporting communications between an access network and a core network may comprise a processor and a memory storing at least one instruction executed by the processor. Also, the at least one instruction may be configured to transmit a request message for requesting a channel state report to at least one transport node among a plurality of transport nodes included in the transport network; receive, in response to the request message, a response message including channel state information from the at least one transport node; determine at least one protocol layer to be used in the at least one transport node based on the channel state information; and transmit a control message including information on the determined at least one protocol layer to the at least one transport node.

The at least one instruction may be further configure to receive a report message including information on a source and a destination of a packet from a first transport node connected to the access network or a second transport node connected to the core network among the plurality of transport nodes, wherein the report message is received before the transmission of the request message.

The report message may further include a result of a deep packet inspection (DPI) on the packet.

The first transport node may support at least one communication protocol used by the access network and a common communication protocol used by the transport network, and the second transport node may support at least one communication protocol used by the core network and the common communication protocol.

The at least one instruction may be further configured to determine a communication path of the packet based on the information included in the report message and the response message, wherein the communication path is determined before the transmission of the control message, and the control message may further include information on the determined communication path.

The communication path may be determined based on a transmission speed and a delay time required for transmission of the packet.

The at least one protocol layer may be determined to be a physical (PHY) layer when a channel state indicated by the channel state information is equal to or larger than a predetermined threshold.

The at least one protocol layer may be determined to be a physical (PHY) layer, a medium access control (MAC) layer, and a radio link control (RLC) layer when a channel state indicated by the channel state information is less than a predetermined threshold.

In order to achieve the objective of the present disclosure, a communication path control method of a controller in a transport network may comprise transmitting a request message requesting information necessary for determining a final communication path to a plurality of transport nodes included in the transport network; receiving, in response to the request message, a response message including the information necessary for determining a final communication path; determining a final communication path among a predetermined number of candidate communication paths predetermined based on an overall resource state indicator, an overall channel state indicator, and an overall network state indicator which are determined based on the information included in the response message; and transmitting information on the final communication path to a plurality of transport nodes included in the final communication path.

The final communication path may be a candidate communication path having a minimum sum of resource state indicators, channel state indicators, and network state indicators of a plurality of transport nodes included therein among the plurality of candidate communication paths.

The overall resource state indicator may be determined by summing all resource state indicators indicating utilization rates of resources in a plurality of transport nodes included in a specific candidate communication path among the plurality of candidate communication paths.

The overall channel quality indicator may be determined by summing all channel quality indicators indicating the respective channel states obtained through a plurality of transport nodes included in a specific candidate communication path among the plurality of candidate communication paths.

The overall network state indicator may be determined by summing all network state indicators indicating degrees of congestion of a plurality of transport nodes included in a specific candidate communication path among the plurality of candidate communication paths.

The final communication path may be determined by further considering a service priority of a service provider transmitting a transmission data unit.

The information on the final communication path may include a flow rule that is a rule for transmitting a transmission data unit through a plurality of transport nodes included in the final communication path.

The plurality of candidate communication paths may be determined among a plurality of communication paths including a source transport node and a destination transport node determined based on source and destination information of a transmission data unit received from an end transport node included in the transport network.

In order to achieve the objective of the present disclosure, a controller for controlling a communication path in a transport network may comprise a processor and a memory storing at least one instruction executed by the processor. Also, the at least one instruction may be configured to configure a plurality of candidate communication paths based on source and destination information of a transmission data unit received from an end transport node included in the transport network; transmit a request message requesting information necessary for determining a final communication path to a plurality of transport nodes included in the transport network; receive, in response to the request message, a response message including the information necessary for determining a final communication path; determine an overall resource state indicator, an overall channel state indicator, and an overall network state indicator which are necessary for determining a final communication path, based on the information included in the response message; determine the final communication path among the plurality of candidate communication paths based on the overall resource state indicator, the overall channel state indicator, and the overall network state indicator; and transmit information on the final communication path to a plurality of transport nodes included in the final communication path.

The final communication path may be a candidate communication path having a minimum sum of resource state indicators, channel state indicators, and network state indicators of a plurality of transport nodes included therein among the plurality of candidate communication paths.

The overall resource state indicator may be determined by summing all resource state indicators indicating utilization rates of resources in a plurality of transport nodes included in a specific candidate communication path among the plurality of candidate communication paths.

The overall channel quality indicator may be determined by summing all channel quality indicators indicating the respective channel states obtained through a plurality of transport nodes included in a specific candidate communication path among the plurality of candidate communication paths.

The overall network state indicator may be determined by summing all network state indicators indicating degrees of congestion of a plurality of transport nodes included in a specific candidate communication path among the plurality of candidate communication paths.

The final communication path may be determined by further considering a service priority of a service provider transmitting a transmission data unit.

The information on the final communication path may include a flow rule that is a rule for transmitting a transmission data unit through a plurality of transport nodes included in the final communication path.

The plurality of candidate communication paths may be determined among a plurality of communication paths including a source transport node and a destination transport node determined based on source and destination information of a transmission data unit received from an end transport node included in the transport network.

In order to achieve the objective of the present disclosure, a transport node included in a transport network may comprise a processor and a memory storing at least one instruction executed by the processor. Also, the at least one instruction may be configured to transmit a request message requesting information necessary for determining a final communication path to a plurality of transport nodes included in the transport network; receive, in response to the request message, a response message including the information necessary for determining a final communication path; determine a final communication path among a predetermined number of candidate communication paths predetermined based on an overall resource state indicator, an overall channel state indicator, and an overall network state indicator which are determined based on the information included in the response message; and transmit information on the final communication path to a plurality of transport nodes included in the final communication path.

The transport node may be further configured to transmit a message including source and destination information of a transmission data unit to a controller; receive a request message requesting information necessary for determining a final communication path from a controller; transmit, in response to the request message, a response message including the information necessary for determining a final communication path to the controller; receive the information on the final communication path from the controller; and transmit the transmission data unit based on the information on the final communication path.

The information necessary for determining a final communication path may include resource state indicators indicating utilization rates of resources in a plurality of transport nodes included in a specific candidate communication path among the plurality of candidate communication paths, channel state indicators indicating channel states obtained through a plurality of transport nodes included in a specific candidate communication path among the plurality of candidate communication paths, and network quality indicators indicating degrees of congestion of a plurality of transport nodes included in a specific candidate communication path among the plurality of candidate communication paths.

The information on the final communication path may include a flow rule that is a rule for transmitting a transmission data unit through a plurality of transport nodes included in the final communication path.

Using the embodiments according to the present disclosure, in the transport network, a communication path and at least one protocol layer may be configured based on the state of the transport node (e.g., resource state, channel state, network state, etc.) and the characteristics of packets (e.g., source information, destination information, type, and QoS information of the packets). The transport node located in the communication path determined in the transport network may transmit and receive packets by using the determined at least one network.

For example, in case that the channel state (e.g., received signal strength) is equal to or greater than a preset threshold, at least one protocol layer to be used for communications between the transport nodes may be determined to be a protocol layer (e.g., a PHY layer) that does not support a retransmission procedure. In this case, since only the function of the PHY layer is performed for transmission and reception of packets, a transmission delay of the packets in the transport network can be reduced. On the other hand, in case that the channel state (e.g., received signal strength) is equal to or less than the preset threshold, at least one protocol layer to be used for communications between the transport nodes may be determined to be at least one protocol layer (e.g., RLC layer, MAC layer, and PHY layer) supporting a retransmission procedure. In this case, since the functions of the RLC layer, MAC layer, and PHY layer are performed for transmission and reception of packets, transmission of the packets can be guaranteed in the transport network. Accordingly, the packets can be efficiently transmitted and received in the transport network.

Meanwhile, an end node of the transport network may support a plurality of communication protocols to perform communications with a base station or a core network supporting different communication protocols. For example, an end transport node may process packets received from a base station or a core network using a common communication protocol used in the transport network, and may transmit the processed packets to another transport node located in the transport network. Also, an end transport node may process packets received from another transport node located in the transport network using a communication protocol used in the base station or the core network, and transmit the processed packets to the base station or the core network. That is, in the transport network, the end transport node can perform the communication protocol conversion function.

Accordingly, a transport node other than the end transport node among the transport nodes included in the transport network may not support the communication protocol conversion function (i.e., the communication protocol conversion function supported by the end transport node), and may be configured to support functions for transmitting and receiving packets (e.g., high-speed transmission functions). Therefore, since functions supported by the transport node can be configured based on the characteristics of the transport node, the transport network can be efficiently configured. As a result, the performance of the transport network can be improved.

Also, a transmission delay that may occur in the transport network can be reduced, and a packet loss that may occur in the transport network can also be reduced, thereby improving transmission reliability. The quality of transmission services can be further improved by reducing the transmission delay and improving the transmission reliability.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
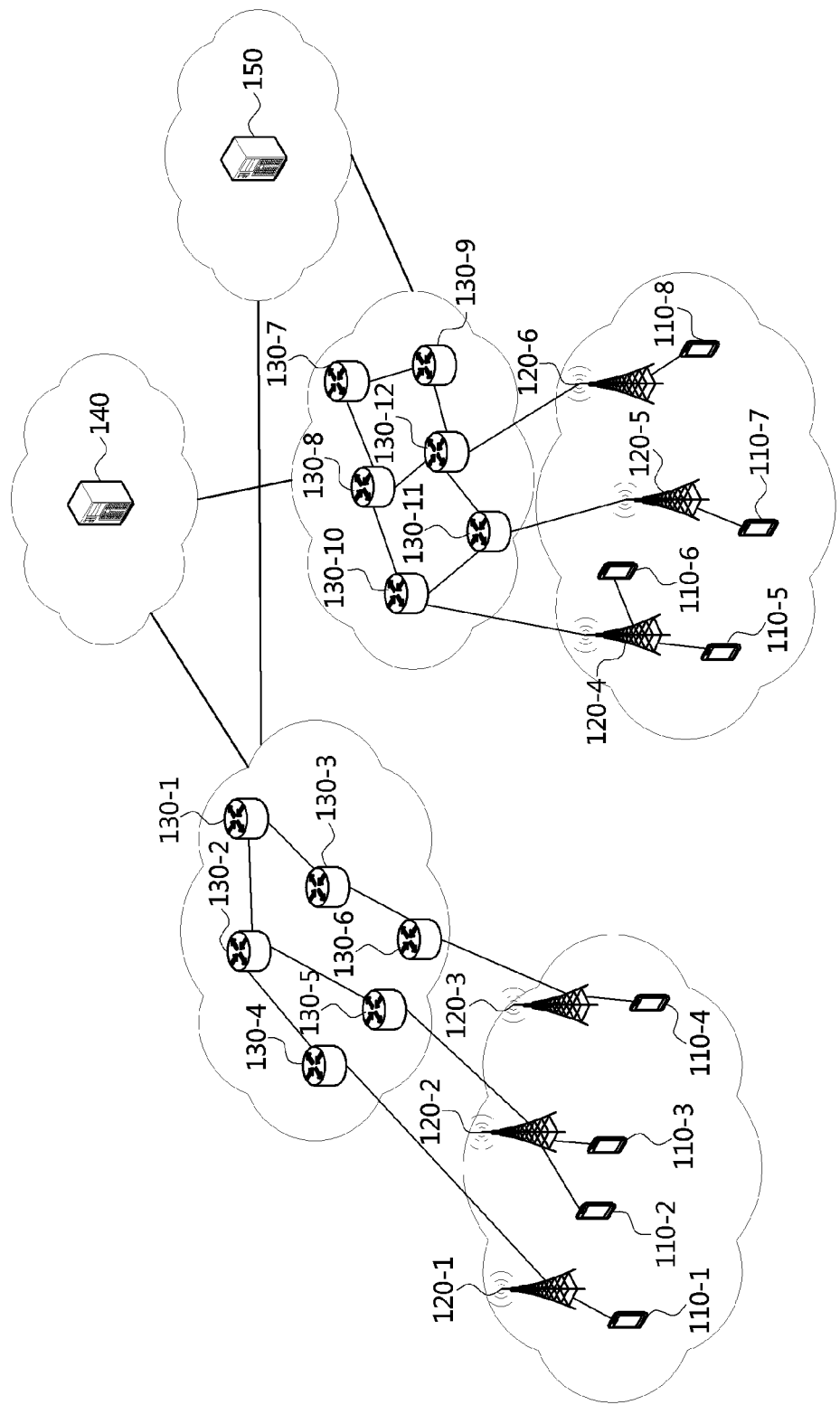
FIG. 1 is a conceptual diagram illustrating a first embodiment of a communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following description, a communication network to which embodiments according to the present disclosure are applied will be described. The communication network to which the embodiments according to the present disclosure are applied is not limited to the following description, and the embodiments according to the present disclosure may be applied to various communication networks.

FIG. 1 is a conceptual diagram illustrating a first embodiment of a communication network.

Referring to FIG. 1, a communication network may comprise an access network, a transport network, a core network, and the like. The access network may include terminals 110-1 to 110-8, base stations 120-1 to 120-6, and the like. Each of the base stations 120-1 to 120-6 may be a radio unit (RU), a remote radio head (RRH), or the like. The terminals 110-1 to 110-8 may be connected to the base stations 120-1 to 120-6, and the communications between the terminals 110-1 to 110-8 and the base stations 120-1 to 120-6 may be performed based on 4G communication technologies such as a long term evolution (LTE) communication technology and an LTE-advanced (LTE-A) communication technology defined in the 3rd generation partnership project (3GPP), and 5G communication technologies such as millimeter wave (mmWave)-based communication technology and a new radio (NR) communication technology.

The transport network may support communications between the access network and the core network. For example, the transport network may transmit packets (e.g., control packets, data packets) received from the access network to the core network, and may transmit packets received from the core network to the access network. The transport network may be referred to as an 'Xhaul transport network' or a 'crosshaul transport network'.

The transport network may include a plurality of transport nodes (TNs) 130-1 to 130-12. The communications between the TNs 130-1 to 130-12 may be performed using a wired communication technology (e.g., optical communication technology, Ethernet technology, etc.) or a wireless communication technology (e.g., mmWave communication technology). For example, the communications between the TNs 130-1 to 130-6 may be performed using a wireless communication technology, and the communications between the TNs 130-7 to 130-12 may be performed using a wired communication technology.

The operations (e.g., transmission and reception of packets) of the plurality of TNs 130-1 to 130-12 included in the transport network may be controlled by the controller 140. The controller 140 may be included in the transport network. Alternatively, the controller 140 may be configured separately from the transport network. Among the plurality of TNs 130-1 to 130-12, end TNs may be connected to the access network, the core network, the controller 140, and the like. For example, the first TN 130-1 may be connected to the core network and the controller 140, and the TNs 130-4 to 130-6 may be respectively connected to the base stations 120-1 to 120-3. The seventh TN 130-7 may be connected to the core network and the controller 140, and the TNs 130-10 to 130-12 may be respectively connected to the base stations 120-4 to 120-6.

The controller 140 may be connected to the transport network and may control the operations of the plurality of TNs 130-1 to 130-12 included in the transport network. The controller 140 may be referred to as an 'Xhaul controller' or a 'crosshaul controller', and may support software defined network (SDN) technologies. For example, the controller 140 may perform a communication path configuration operation, a packet transmission/reception control operation, and the like in the transport network by using an SDN-based flow control protocol.

The core network may be connected to the transport network and may communicate with the access network via the transport network. In case that the core network is an evolved packet core (EPC) network, a core node 150 included in the core network may be a mobility management entity (MME), a serving gateway (S-GW), or a packet data network (PDN)-gateway. In case that the core network supports a cloud-radio access network (C-RAN), the core node 150 may be a baseband unit (BBU) or the like. The BBU may indicate a BBU pool.

Meanwhile, the communication node included in the communication network shown in FIG. 1 may be configured as follows.

Figure 2:
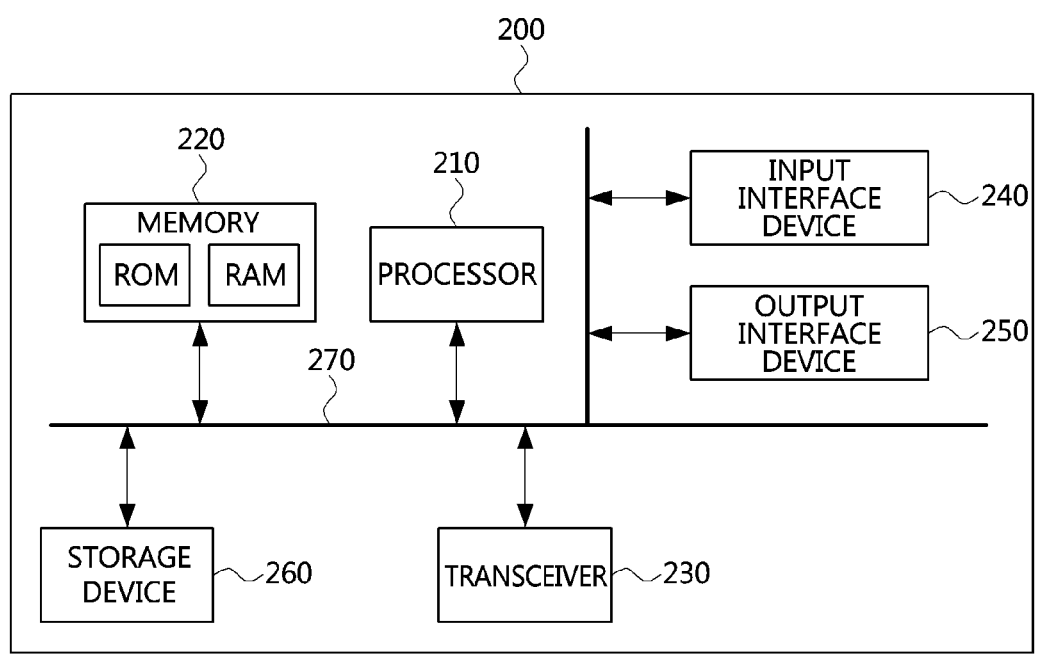
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, an operation method of a communication node included in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, communications may be performed based on a relay technology in the communication network.

Figure 3:
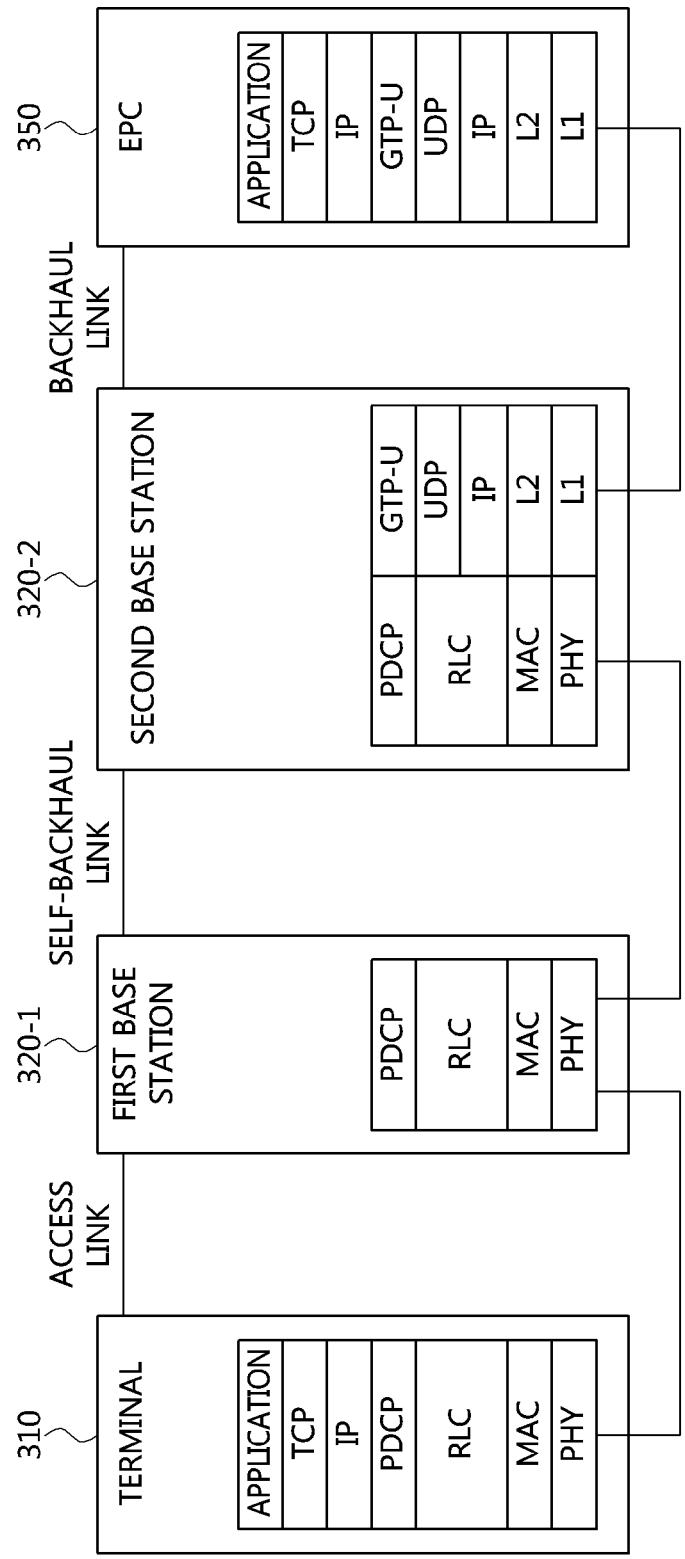
FIG. 3 is a conceptual diagram illustrating a first embodiment of a relay-based communication method in a communication network.

FIG. 3 is a conceptual diagram illustrating a first embodiment of a relay-based communication method in a communication network.

Referring to FIG. 3, a communication network may comprise a terminal 310, a first base station 320-1, a second base station 320-2, an evolved packet core (EPC) 350, and the like. The terminal 310 may be the same as or similar to each of the terminals 110-1 through 110-8 in the communication network of FIG. 1, and the protocol layers (e.g., user plane protocol layers) of the terminal 310 may include an application layer, a transmission control protocol (TCP) layer, an internet protocol (IP) layer, a packet data convergence protocol (PDCP) layer, a radio link control (RLC) layer, a medium access control (MAC) Layer, a physical (PHY) layer, and the like.

The first base station 320-1 may be the same as or similar to each of the base stations 120-1 through 120-6 in the communication network of FIG. 1, and the protocol layers (e.g., user plane protocol layers) of the first base station 320-1 may include a PDCP layer, an RLC layer, a MAC layer, a PHY layer, and the like. The second base station 320-2 may be the same as or similar to each of the base stations 120-1 through 120-6 in the communication network of FIG. 1, and the protocol layers (e.g., user plane protocol layers) of the second base station 320-2 may include a PDCP layer, an RLC layer, a MAC layer, a PHY layer, a general packet radio service (GPRS) tunneling protocol-user plane (GTP-U) layer, a user datagram protocol (UDP) layer, an IP layer, a layer-2 (L2) layer, and a layer-1 (L1) layer, and the like. The EPC 350 may be the same as or similar to the core node 150 in the communication network of FIG. 1, and the protocol layers of the EPC 350 (e.g., user plane protocol layers) may include an application layer, a TCP layer, an IP layer, a GTP-U layer, a UDP layer, an L2 layer, an L1 layer, and the like.

An access link may be established between the terminal 310 and the first base station 320-1 and communications between the terminal 310 and the first base station 320-1 may be performed using the access link. A self-backhaul link may be established between the first base station 320-1 and the second base station 320-2, and communications between the first base station 320-1 and the second base station 320-2 may be performed using the self-backhaul link. The self-backhaul link may be a link included in the transport network in the communication network of FIG. 1. Here, the first base station 320-1 may be a relay base station, and the second base station 320-2 may be an anchor base station. A backhaul link may be established between the second base station 320-2 and the EPC 350, and communications between the second base station 320-2 and the EPC 350 may be performed using the backhaul link.

A packet transmitted from the terminal 310 to the EPC 350 (or a packet transmitted from the EPC 350 to the terminal 310) may be transmitted to the EPC 350 (or the terminal 310) after functions of the upper layers (e.g., MAC layer, RLC layer, PDCP layer, L2 layer, IP layer, UDP layer, GTP-U layer, etc.) as well as a function of the PHY layer (e.g., L1 layer) are performed thereon in the base stations 320-1 and 320-2.

For example, in case that a required delay time for transmission of the packet is 20 milliseconds, if the functions of the upper layers (e.g., MAC layer, RLC layer, PDCP layer, L2 layer, IP layer, UDP layer, GTP-U layer, etc.) as well as the function of the PHY layer (e.g., L1 layer) are performed, the transmission of the packet may not satisfy the required delay time.

In order to solve the above-described problem, if a packet is transmitted to the EPC 350 (or the terminal 310) after only the function of the PHY layer (e.g., L1 layer) is performed in the base stations 320-1 and 320-2, the packet may not be received at the EPC 350 (or the terminal 310) depending on the state of the link (e.g., access link, self-backhaul link, or backhaul link). Hereinafter, communication methods for solving this problem will be described below.

Figure 4:
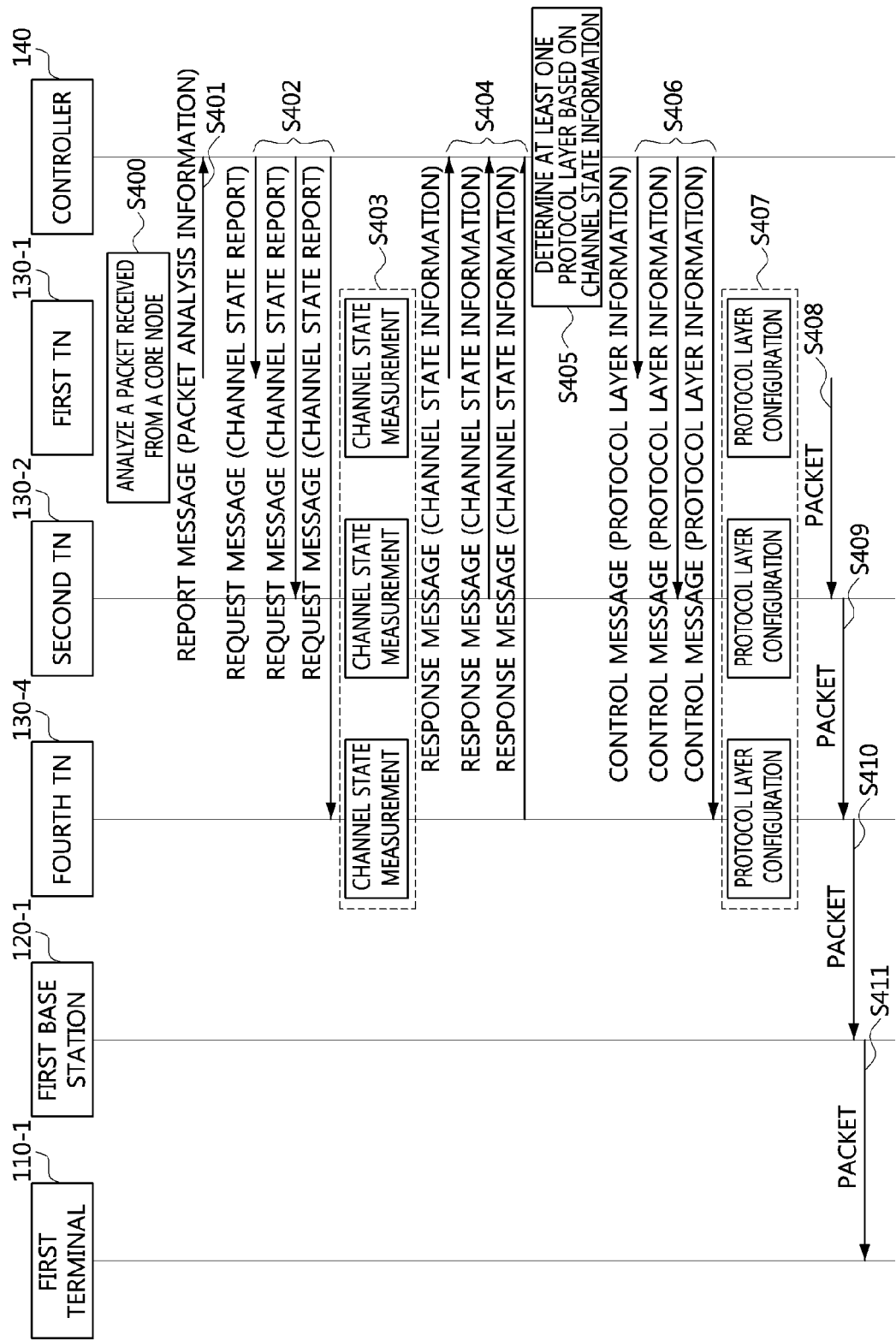
FIG. 4 is a sequence chart illustrating a first embodiment of a communication method in a communication network.

FIG. 4 is a sequence chart illustrating a first embodiment of a communication method in a communication network.

Referring to FIG. 4, a communication network may comprise a first terminal 110-1, a first base station 120-1, a first TN 130-1, a second TN 130-2, a fourth TN 130-4, a controller 140, and the like. Each of the first terminal 110-1, the first base station 120-1, the first TN 130-1, the second TN 130-2, the fourth TN 130-4, and the controller 140 may be each of the first terminal 110-1, the first base station 120-1, the first TN 130-1, the second TN 130-2, the fourth TN 130-4, and the controller 140 which are illustrated in FIG. 1. Also, each of them may be configured to be the same as or similar to the communication node 200 shown in FIG. 2.

The access network may include the first terminal 110-1, the first base station 120-1, and the like. The first terminal 110-1 may be connected to the first base station 120-1, and the first base station 120-1 may be a radio unit (RU), a radio remote head (RRH), or the like. The transport network may include the first TN 130-1, the second TN 130-2, the fourth TN 130-4, and the like. Communications between the TNs 130-1, 130-2, and 130-4 may be performed based on wireless communication technologies (e.g., a mmWave communication technology). The first TN 130-1 and the fourth TN 130-4 may be end TNs in the transport network. An end TN (e.g., the first TN 130-1) connected to the controller 140 and the core node 150 may be referred to as a gateway (or an Xhaul gateway).

The first TN 130-1 may be connected to the controller 140 and the core node 150, and may support a plurality of communication protocols to perform communications with the controller 140 and the core node 150 which use different communication protocols. Also, the first TN 130-1 may support a common communication protocol used in the transport network. The first TN 130-1 may process the packet received from the controller 140 or the core node 150 using the common communication protocol used in the transport network, and transmit the processed packet to other TNs placed in the transport network.

Also, the fourth TN 130-4 may be connected to the first base station 120-1, and may support a plurality of communication protocols to perform communications with the first base station 120-1 using different communication protocols. Also, the fourth TN 130-4 may support the common communication protocol used in the transport network. The fourth TN 130-4 may process the packet received from the first base station 120-1 using the common communication protocol used in the transport network, and transmit the processed packet to other TNs placed in the transport network.

That is, a TN (e.g., the second TN 130-2) other than the end node (e.g., the first TN 130-1 or the fourth TN 130-4) among the TNs included in the transport network may be configured to support only a function of transmitting and receiving the packet (e.g., a high-speed transmission function), and the end TN may support functions which are not supported by the TN supporting only the function of transmitting and receiving the packet. Therefore, the supported functions may be configured according to the characteristics of the TN in the transport network, so that the transport network can be efficiently configured.

The core node 150 may be a mobility management entity (MME), a serving gateway (S-GW), a PDN gateway (P-GW), a baseband unit (BBU) (or a BBU pool), or the like. The controller 140 may perform functions of a radio resource control (RRC) layer and may control communications of the TNs 130-1, 130-2, and 130-4 included in the transport network. The controller 140 may be configured as follows.

Figure 5:
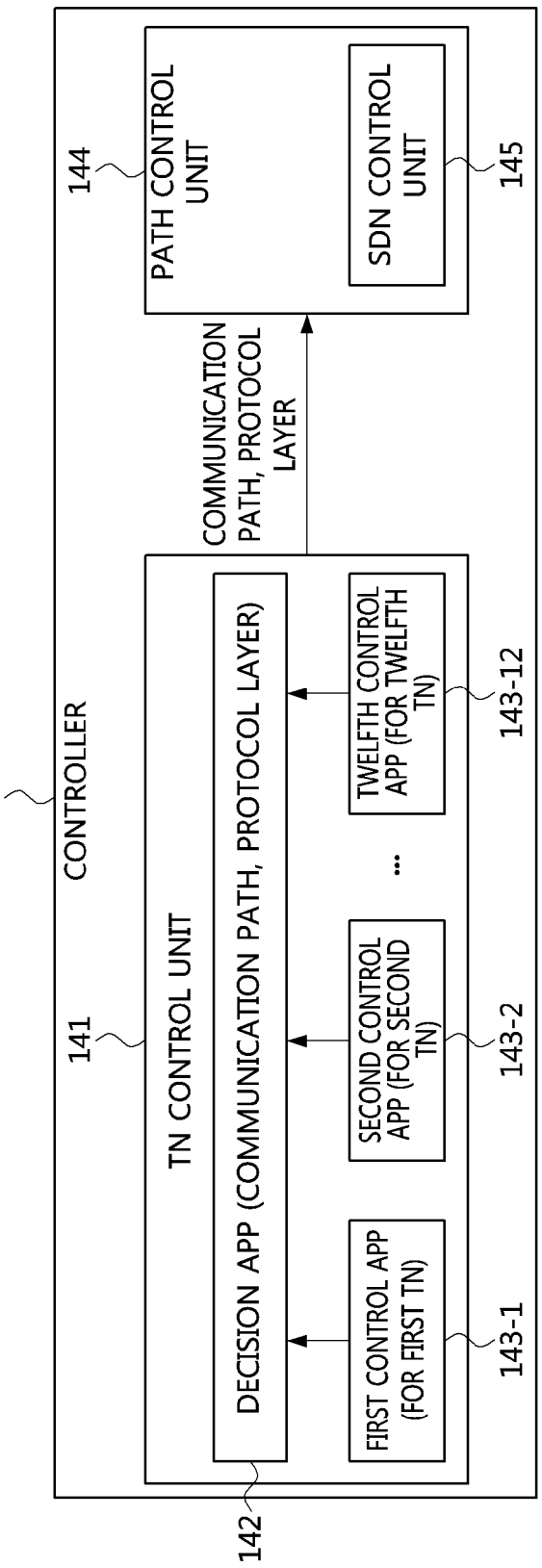
FIG. 5 is a block diagram illustrating a first embodiment of a controller in a communications network.

FIG. 5 is a block diagram illustrating a first embodiment of a controller in a communications network.

Referring to FIG. 5, a controller 140 may comprise a TN control unit 141 and a path control unit 144. The TN control unit 141 and the path control unit 144 may be configured using the processor 200 shown in FIG. 2. The TN control unit 141 may include a decision application (APP) 142 and a plurality of control APPs 143-1 to 143-12. For example, each of the plurality of control APPs 143-1 to 143-12 may be mapped to each of the plurality of TNs 130-1 to 130-12 in the communication network of FIG. 1.

In this case, the controller 140 may use the plurality of control APPs 143-1 to 143-12 to control the TNs 130-1 to 130-12. For example, the controller 140 may obtain channel state information of the TNs 130-1 to 130-12 through the plurality of control APPs 143-1 to 143-12, and the channel state information may be transferred to the decision APP 142. The decision APP 142 may determine a communication path of the packet based on the channel state information, packet analysis information received from the end TNs, and the like, and determine at least one protocol layer used in the TNs located in the determined communication path. The TN control unit 141 may inform the path control unit 144 of the determined communication path and at least one protocol layer.

The path control unit 144 may include a software defined network (SDN) control unit 145. That is, the path control unit 144 may support SDN technologies. The path control unit 144 may obtain information on the communication path and the at least one protocol layer from the TN control unit 141, transmit the information on the communication path and the at least one protocol layer to the TNs (i.e., TNs included in the determined communication path), and control communications of the TNs based on the information on the communication path and the at least one protocol layer.

Referring again to FIG. 4, the first TN 130-1 may receive a packet (e.g., control packet or data packet) from the core node 150. The packet may be transmitted from the core node 150 to the first TN 130-1 through a GTP-U tunnel established between the first TN 130-1 and the core node 150. The first TN 130-1 may analyze the received packet (S400). For example, the first TN 130-1 may perform analysis on the packet using a deep packet inspection (DPI) technology. Through the analysis, the first TN 130-1 may obtain information on a source (i.e., a source address) of the packet, a destination (i.e., a destination address) of the packet, the type of the packet (e.g., control packet or data packet), a quality of service (QoS) of the packet, and the like. Here, the source may indicate the core node 150 or another communication node (e.g., the terminal), and the destination may indicate the first terminal 110-1. The QoS of the packet may include a QoS class identifier (QCI), an allocation and retention priority (ARP), a required transmission rate (e.g., guaranteed bit rate (GBR), a maximum bit rate (MBR), a required delay time (e.g., a packet delay budget (PDB)), and the like.

The first TN 130-1 may generate a report message including analysis information (e.g., source information, destination information, type, QoS information, etc.) of the packet, and transmit the generated report message to the controller 140 (S401). The controller 140 (e.g., the TN control unit 141 or the path control unit 144) may receive the report message from the first TN 130-1, and identify the analysis information of the packet from the received report message. For example, the controller 140 may determine that there is a packet to be transmitted from the first TN 130-1 to the first terminal 110-1 based on the report message, and identify the type and QoS of the packet to be transmitted to the first terminal 110-1.

The controller 140 may transmit a request message to the TNs belonging to the transport networks (e.g., the transport network to which the first TN 130-1 belongs and the transport network connected to the access network to which the first terminal 110-1 belongs) (S402). The request message may be transmitted through the control APP of the controller 140. For example, the request message may be transmitted to the first TN 130-1, the second TN 130-2, and the twelfth TN 130-12 though the first control APP 143-1, the second control APP 143-2, and the twelfth control APP 143-12. The request message may instruct to report a channel state between the TNs, a resource state (e.g., available resources) of each TN, a network state, and the like. In FIG. 4, the request message is illustrated as transmitted to the first TN 130-1, the second TN 130-2, and the fourth TN 130-4. However, the request message may also be transmitted in a broadcasting scheme.

Alternatively, the controller 140 (e.g., the decision APP 142 of the controller 140) may determine a communication path (e.g., a candidate communication path) for transmission of the packet based on the information included in the report message, and transmit a request message to the TNs located in the communication path. For example, in case that the communication path (e.g., the candidate communication path) is determined as (fourth TN 130-4→second TN 130-2→first TN 130-1), the controller 140 may transmit the request message to the first TN 130-1, the second TN 130-2, and the fourth TN 130-4.

Upon receiving the request message from the controller 140, each of the TNs included in the transport network may measure channel states with neighbor TNs (S403). For example, each of the second TN 130-2 and the fourth TN 130-4 may measure a channel state (e.g., received signal strength) between the second TN 130-2 and the fourth TN 130-4, and each of the first TN 130-1 and the second TN 130-2 may measure a channel state (e.g., received signal strength) between the first TN 130-1 and the second TN 130-2. The TN having received the request message may generate a response message including the channel state information (e.g., received signal strengths), resource state information (e.g., information on available resources), network state information, etc., and transmit the generated response message to the controller 140 (S404). In FIG. 4, although the steps S403 and S404 are illustrated as performed in the first TN 130-1, the second TN 130-2, and the fourth TN 130-4, the steps S403 and S404 may be performed by the TN receiving the request message.

The controller 140 may receive the response messages from the TNs. The response messages may be received through the control APP of the controller 140. For example, the response messages may be received from the first TN 130-1, the second TN 130-2, and the twelfth TN 130-12 through the first control APP 143-1, the second control APP 143-2, and the twelfth control APP 143-12, respectively.

If the communication path of the packet is not determined prior to the step S402, the controller 140 (e.g., the decision APP 142 of the controller 140) may determine the communication path of the packet based on the information contained in the report message, the information contained in the response message, and the like. For example, the controller 140 may determine the communication path of the packet by considering the source, destination, type, and QoS of the packet as well as the channel state information and the resource state information of the TNs.

In case that the communication path of the packet is determined as (the fourth TN 130-4→the second TN 130-2→the first TN 130-1), the controller 140 (e.g., the decision APP 142 of the controller 140) may determine at least one protocol layer to be used in the first TN 130-1, the second TN 130-2, and the fourth TN 130-4 which belong to the determined communication path (S405). The at least one protocol layer may be determined based on the channel state information included in the response messages. For example, when the channel state information (e.g., received signal strength) indicates a value equal to or greater than a predetermined threshold, the controller 140 may determine a protocol layer which does not support a retransmission procedure (e.g., the PHY layer) as the at least one protocol layer to be used for the transmission of the packet. On the other hand, when the channel state information (e.g., received signal strength) indicates a value less than the predetermined threshold, the controller 140 may determine at least one protocol layer supporting a retransmission procedure (e.g., the PHY layer, the MAC layer, and the RLC layer) as the at least one protocol layer to be used for the transmission of the packet. After the communication path and the at least one protocol layer are determined in the TN control unit 141, information on the determined communication path and at least one protocol layer may be transmitted from the TN control unit 141 to the path control unit 144.

In the following description, it is assumed that the communication path of the packet is determined as (the fourth TN 130-4→the second TN 130-2→the first TN 130-1), the PHY layer is determined as the at least one protocol layer used for communications between the first TN 130-1 and the second TN 130-2, and the PHY layer, MAC layer, and RLC layer are determined as the at least one protocol layer used for communications between the second TN 130-2 and the fourth TN 130-4.

The controller 140 (e.g., the path control unit 144 or the SDN control unit 145 of the controller 140) may generate a control message including the information on the determined communication path (e.g., flow tables for transmitting and receiving the packet) and the information on the determined at least one protocol layer, and transmit the control message to the TNs located in the communication path (e.g., the first TN 130-1, the second TN 130-2, and the fourth TN 130-4) (S406).

In the control message transmitted to the first TN 130-1, the information on the communication path may indicate the communication path (the fourth TN 130-4→the second TN 130-2→the first TN 130-1), and the information on the at least one protocol layer may indicate the PHY layer. In the control message transmitted to the second TN 130-2, the information on the communication path may indicate the communication path (the fourth TN 130-4→the second TN 130-2→the first TN 130-1), the information on the at least one protocol layer used for the communications between the second TN 130-2 and the first TN 130-1 may indicate the PHY layer, and the information on the at least one protocol layer used for the communications between the second TN 130-2 and the fourth TN 130-4 may indicate the PHY layer, the MAC layer, and the RLC layer. In the control message transmitted to the fourth TN 130-4, the information on the communication path may indicate the communication path (the fourth TN 130-4→the second TN 130-2→the first TN 130-1), and the information on the at least one protocol layer may indicate the PHY layer, the MAC layer, and the RLC layer.

Upon receiving the control message from the controller 140, each of the first TN 130-1, the second TN 130-2, and the fourth TN 130-4 may identify the communication path and the at least one protocol layer based on the control message (S407). For example, the first TN 130-1 may configure the PHY layer for the communications between the first TN 130-1 and the second TN 130-2. The second TN 130-2 may configure the PHY layer for the communications between the first TN 130-1 and the second TN 130-2, and configure the PHY layer, MAC layer, and RLC layer for the communications between the second TN 130-2 and the fourth TN 130-4. The fourth TN 130-4 may configure the PHY layer for the communications between the second TN 130-2 and the fourth TN 130-4. In the communication path (the first terminal 110-1→the first base station 120-1→the fourth TN 130-4→the second TN 130-2→the first TN 130-1), the transmission of the packet may be performed as follows.

Figure 6:
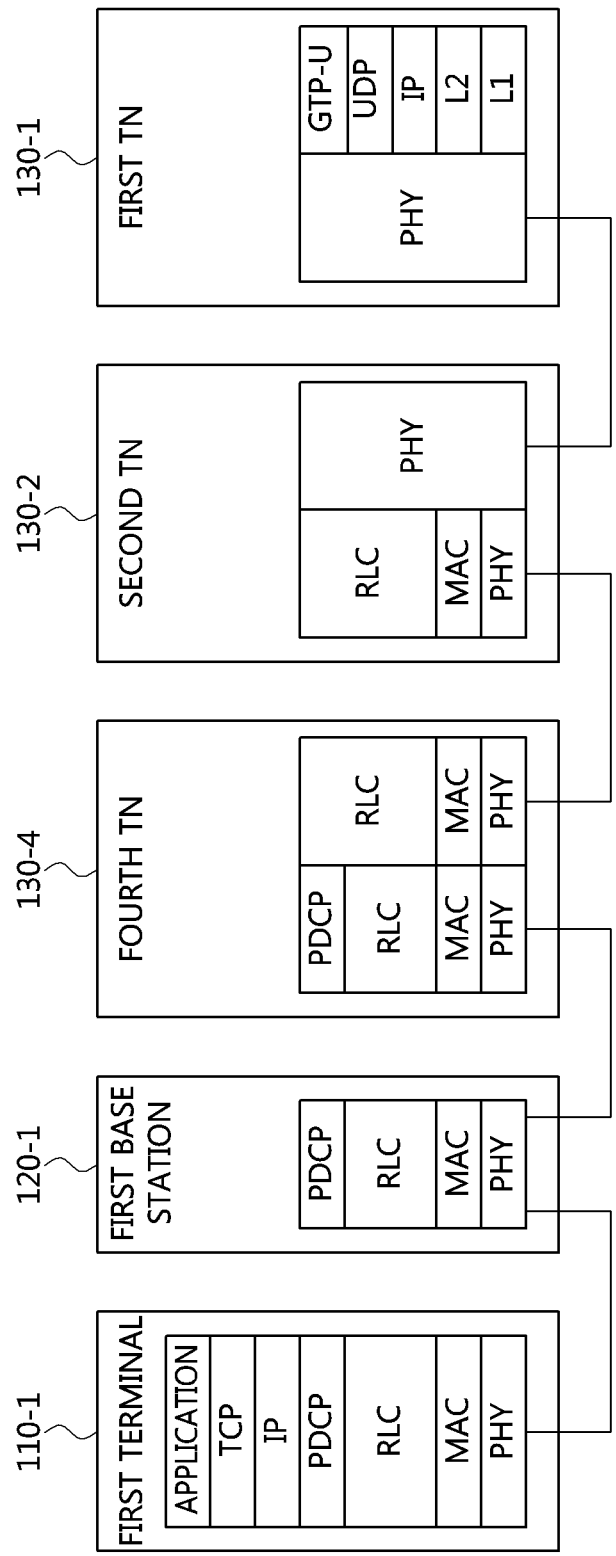
FIG. 6 is a conceptual diagram illustrating a first embodiment of a packet transmission method in a communication network.

FIG. 6 is a conceptual diagram illustrating a first embodiment of a packet transmission method in a communication network.

Referring to FIG. 6, a communication network may comprise a first terminal 110-1, a first base station 120-1, a first transport node (TN) 130-1, a second TN 130-2, a fourth TN 130-4, a controller 140, and the like. The first terminal 110-1, the first base station 120-1, the first TN 130-1, the second TN 130-2, and the fourth TN 130-4 may be identical to the first terminal 110-1, the first base station 120-1, the first TN 130-1, the second TN 130-2, and the fourth TN 130-4 which are illustrated in FIG. 4.

Since the communications between the first TN 130-1 and the second TN 130-2 are performed through the PHY layer, the first TN 130-1 may process packets received from the core node 150 by performing functions of the PHY layer (e.g., coding, modulation, resource mapping, etc.), and transmit the packets on which the functions of the PHY layer are performed to the second TN 130-2 (S408). The second TN 130-2 may receive the packets from the first TN 130-1, and process the packets by performing functions of the PHY layer (e.g., decoding, demodulation, resource demapping, etc.). Since only the functions of the PHY layer are performed for the communications between the first TN 130-1 and the second TN 130-2, a transmission delay of the packets may be reduced.

Since the communications between the second TN 130-2 and the fourth TN 130-4 are performed through the PHY layer, the MAC layer, and the RLC layer, the second TN 130-2 may process packets received from the first TN 130-1 by performing functions of the RLC layer (e.g., acknowledged mode (AM) function, etc.), functions of the MAC layer (e.g., hybrid automatic repeat request (HARQ) function, scheduling function, etc.), and functions of the PHY layer (e.g., coding, modulation, resource mapping, etc.), and transmit the packets on which the functions of the RLC layer, MAC layer, and PHY layer are performed to the fourth TN 130-4 (S409).

The fourth TN 130-4 may receive the packets from the second TN 130-2, and process the packets by performing functions of the PHY layer (e.g., decoding, demodulation, resource demapping, etc.), functions of the MAC layer (e.g., HARQ function, scheduling function, etc.), and functions of the RLC layer (e.g., AM function, etc.). For example, when a packet is not successfully received from the second TN 130-2, the fourth TN 130-4 may request a retransmission of the packet to the second TN 130-2 by using a function of the RLC layer or the MAC layer. Upon receiving the request of the retransmission from the fourth TN 130-4, the second TN 130-2 may retransmit the corresponding packet to the fourth TN 130-4. That is, since a retransmission procedure may be performed between the second TN 130-2 and the fourth TN 130-4, the transmission of the packet can be guaranteed.

The fourth TN 130-4 may process packets received from the second TN 130-2 by performing functions of the protocol layers (e.g., PDCP layer, RLC layer, MAC layer, and PHY layer) used for communications between the fourth TN 130-4 and the first base station 120-1, and transmit the processed packets to the first base station 120-1 (S410). The first base station 120-1 may receive the packets from the fourth TN 130-4, and process the received packets by performing functions of the protocol layers (e.g., PDCP layer, RLC layer, MAC layer, and PHY layer) used for communications between the first base station 120-1 and the fourth TN 130-4. Also, the first base station 120-1 may process the packets received from the fourth TN 130-4 by performing functions of the protocol layers (e.g., PDCP layer, RLC layer, MAC layer, and PHY layer) used for communications between the first base station 120-1 and the first terminal 110-1, and transmit the processed packets to the first terminal 110-1 (S411). The first terminal 110-1 may receive the packets from the first base station 120-1, and process the received packets by performing functions of the protocol layers supported by the first terminal 110-1.

Meanwhile, an optimal communication path in the communication network may be configured as follows.

Figure 7:
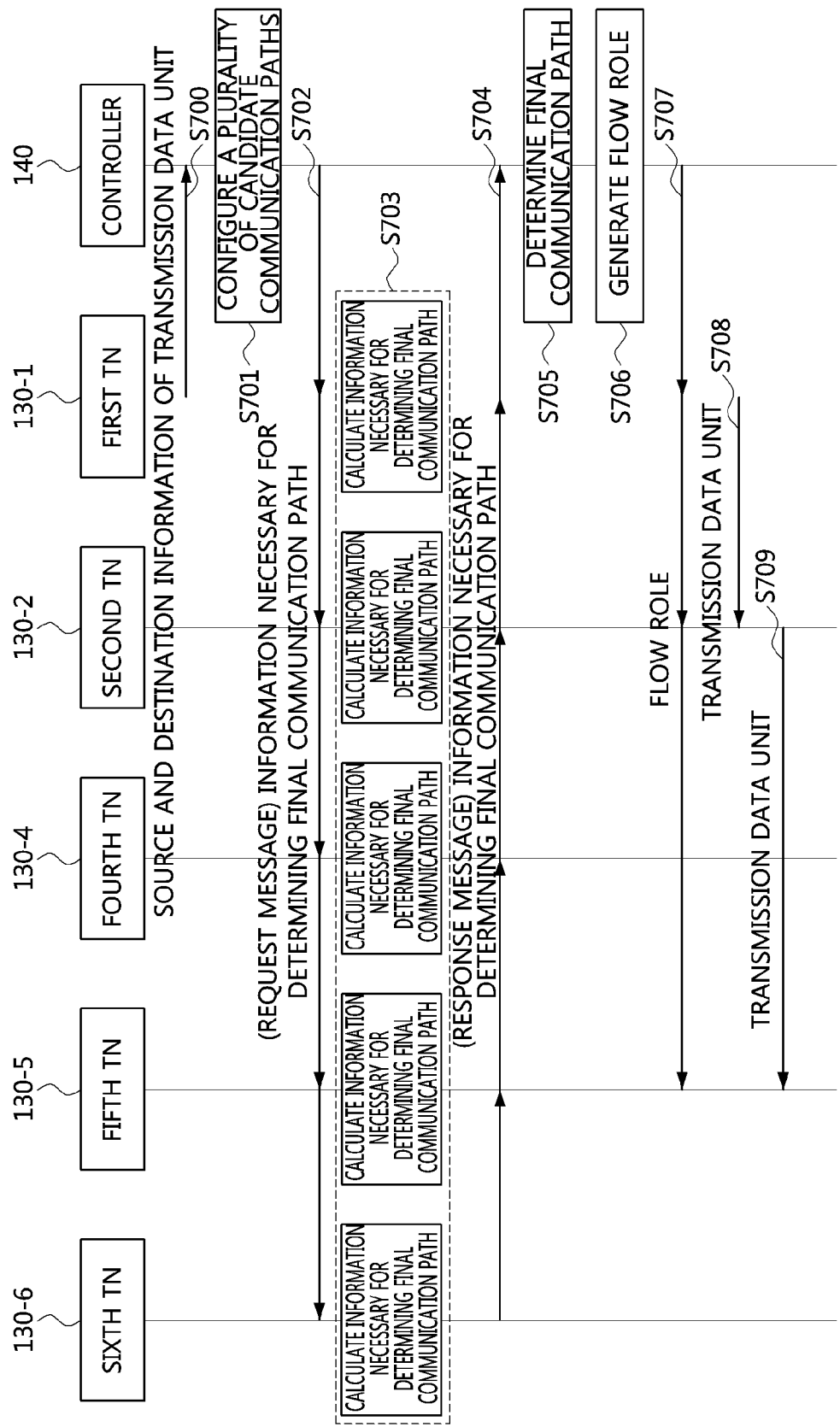
FIG. 7 is a sequence chart illustrating a second embodiment of a communication method in a transport network.

FIG. 7 is a sequence chart illustrating a second embodiment of a communication method in a transport network.

Referring to FIG. 7, the controller 140 and the TNs 130-1 to 130-6 may correspond to the controller 140, and the TNs 130-1 to 130-6. The controller 140 may be configured as follows.

Figure 8:
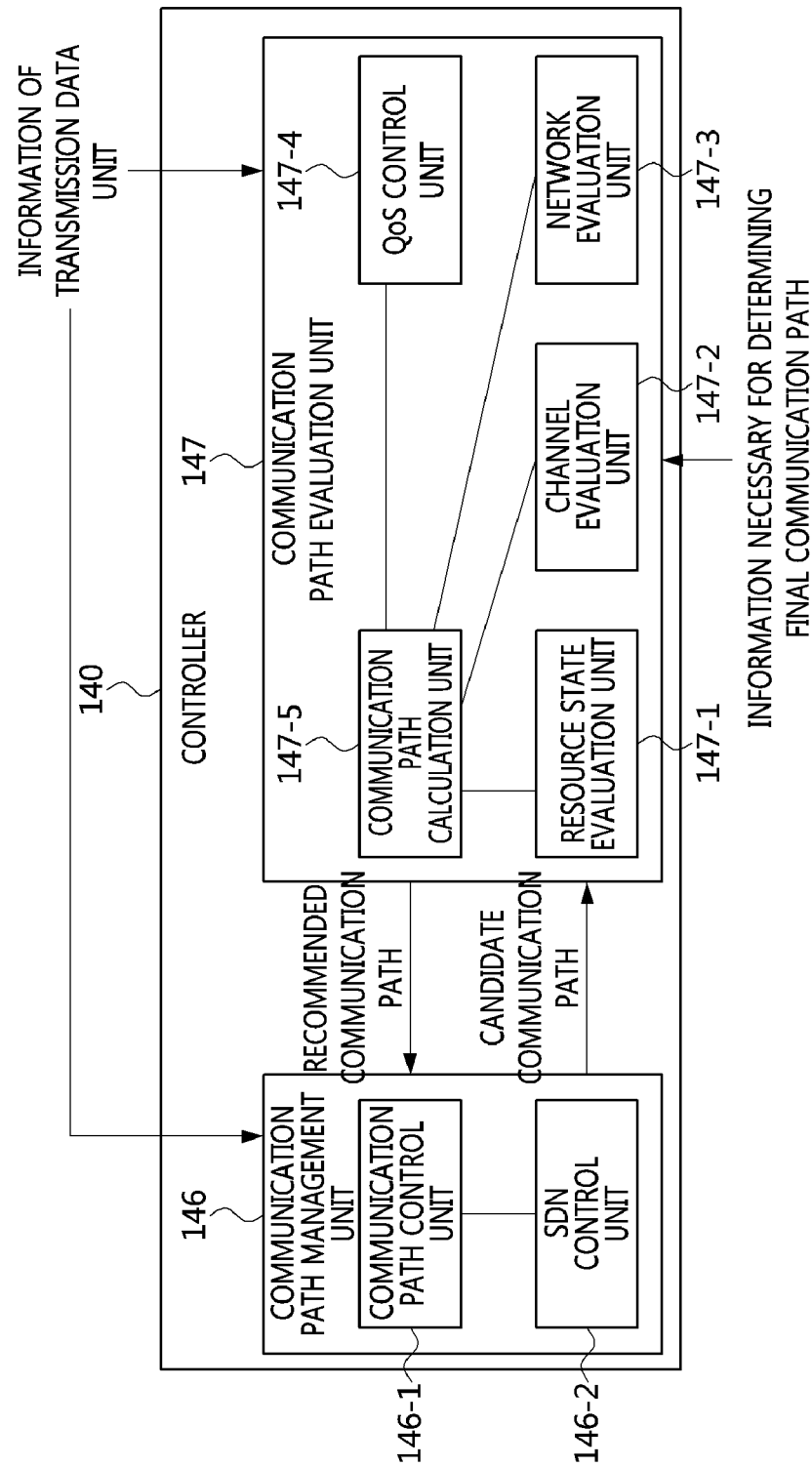
FIG. 8 is a block diagram illustrating a second embodiment of a controller in a transport network.

FIG. 8 is a block diagram illustrating a second embodiment of a controller in a transport network.

Referring to FIG. 8, the controller 140 may comprise a communication path management unit 146 and a communication path evaluation unit 147. The communication path management unit 146 may include a communication path control unit 146-1 and an SDN control unit 146-2.

The communication path evaluation unit 147 may include a resource state evaluation unit 147-1, a channel evaluation unit 147-2, a network evaluation unit 147-3, a quality of service (QoS) control unit 147-4, and a communication path calculation unit 147-5.

The communication path management unit 146 and the communication path evaluation unit 147 may receive transmission data unit information from the end TN. The communication path evaluation unit 147 may receive information necessary for determining a final communication path from the plurality of TN.

The communication path management unit 147 may receive candidate communication paths from the communication path management unit 146. The resource state evaluation unit 147-1 may determine an overall resource state indicator based on the information necessary for determining a final communication path. The channel evaluation unit 147-2 may determine an overall channel quality indicator based the information necessary for determining a final communication path.

The network evaluation unit 147-3 may determine an overall network state indicator based on the information necessary for determining a final communication path. The QoS control unit 147-4 may determine a final communication path among candidate final communication paths considering service provider information indicating a service priority of a service provider transmitting a transmission data unit.

The communication path calculation unit 147-5 may be connected to the resource state evaluation unit 147-1, the channel evaluation unit 147-2, the network evaluation unit 147-3, and the QoS control unit 147-4. The communication path calculation unit 147-5 may receive the overall resource state indicator from the resource state evaluation unit 147-1.

The communication path calculation unit 147-5 may receive the overall channel quality indicator from the channel evaluation unit 147-2. The communication path calculation unit 147-5 may receive the overall network state indicator from the network evaluation unit 147-3.

The communication path calculation unit 147-5 may determine the final communication path based on the overall resource state indicator, the overall channel quality indicator, the overall network state indicator, the service provider information, and the like.

The communication path control unit 146-1 may be connected to the SDN control unit 146-2. The communication path control unit 146-1 may generate a flow rule so that the transmission data unit can be transmitted through a plurality of TNs located in the final communication path, and transmit the generated flow rule to the SDN control unit 146-2.

For example, when a communication path 3 among a plurality of candidate communication paths (e.g., communication paths 1, 2, . . . , n) is determined as the final communication path, the communication path management unit 146 may generate a flow rule corresponding to the communication path 3, and transmit the generated flow rule to the SDN control unit 146-2.

The SDN control unit 146-2 may transmit the flow rule to the plurality of TNs located in the final communication path. The SDN control unit 146-2 may control the transmission data unit to be transmitted through the plurality of TNs located in the final communication path based on the flow rule.

The plurality of components included in the controller 140 may not be physical components. That is, each of the plurality of components included in the controller 140 may mean a logical component defined according to each of the plurality of functions performed by the controller 140.

Referring again to FIG. 7, the first TN 130-1 may transmit information on a source and a destination of a transmission data unit to the controller 140 (S700). The controller 140 may receive the information from the first TN 130-1 (S700).

The controller 140 may determine a source TN and a destination TN of the transmission data unit in the transport network based on the information on the source and destination.

The controller 140 may configure a plurality of candidate communication paths based on information on the source TN and the destination TN of the transmission data unit (S701). Specifically, the controller 140 may configure a plurality of communication paths including the source TN and the destination TN of the transmission data unit to the plurality of candidate communication paths.

For example, in FIG. 1, the first TN 130-1 may receive the transmission data unit from the core node 150. The first TN 130-1 may be the source TN of the transmission data unit. Also, if the destination of the transmission data unit is the first base station 120-1, the fourth TN 130-4 may be the destination TN.

When the source TN and the destination TN are determined as the first TN 130-1 and the fourth TN 130-4, the controller 140 may configure a communication path 1 (130-1→130-2→130-4) and a communication path 2 (130-1→130-3→130-4) to be the plurality of candidate communication paths.

If the destination of the transmission data unit is the second base station 120-2, the fifth TN 130-5 may be the destination TN. When the source TN and the destination TN are determined as the first TN 130-1 and the fifth TN 130-5, the controller 140 may configure a communication path 3 (130-1→130-2→130-5) and a communication path 4 (130-1→130-3→130-5) to be the plurality of candidate communication paths.

If the destination of the transmission data unit is the third base station 120-3, the sixth TN 130-6 may be the destination TN. When the source TN and the destination TN are determined as the first TN 130-1 and the sixth TN 130-6, the controller 140 may configure a communication path 5 (130-1→130-3→130-6) to be the candidate communication path.

The controller 140 may transmit a message requesting the information necessary for determining the final communication path to the TNs 130-1 to 130-6 (S702). The information necessary for determining the final communication path may include a resource state indicator, a channel quality indicator, and a network state indicator. The resource state indicator may indicate a utilization rate of resources at each TN.

The channel quality indicator may indicate the respective channel states obtained through the TNs 130-1 to 130-6. The network state indicator may indicate degree of congestion of each TN obtained from the TNs 130-1 to 130-6.

Each of the TNs 130-1 to 130-6 may calculate the resource state indicator, the channel quality indicator, and the network state indicator, which are the information necessary for determining the final communication path (S703). The resource state indicator may indicate the utilization rate of resources at the corresponding TN, and the utilization rate of resources may be calculated based on the following equation.

$$\text{Utilization rate of } resouces = \frac{\text{size of used resources}}{\text{size of total } resouces \text{ in transport node}} \quad \text{[Equation 1]}$$

The size of total resources in the TN may indicate available resources at the TN. The size of used resources may indicate the size of resources in actual use (e.g., resources occupied for transmission of the transmission data unit).

The channel quality indicator may be calculated based on a received signal strength of a signal transmitted and received through the TNs 130-1 to 130-6. For example, the channel quality indicator may be calculated by measuring a received signal strength of a signal transmitted and received through a channel established between the TNs 130-1 and 130-2.

The channel quality indicator may be set to a low value when the channel quality is good. That is, the larger the channel quality indicator, the lower the transmission performance of the transmission data unit. The network state indicator may be calculated based on a retransmission status, a buffering status, a network congestion status, etc. of the TNs 130-1 to 130-6.

The network state indicator may be set to a low value when the network state is good. The TNs 130-1 to 130-6 may transmit response messages including the information necessary for determining the final communication path to the controller 140 (S704).

The controller 140 may receive the response messages including the information necessary for determining the final communication path from the TNs 130-1 to 130-6 (S704).

The controller 140 may determine the final communication path based on the response messages received from the TNs 130-1 to 130-6 (S705). The process of determining the final communication path based on the information necessary for determining the final communication path may be as follows.

The controller 140 may determine the overall resource state indicator, the overall channel quality indicator, and the overall network state indicator required for determining the final communication path based on the information included in the response messages.

Specifically, the controller 140 may determine the overall resource state indicator by adding all of the resource state indicators indicating the utilization rate of resources at the plurality of TNs included in the communication path.

For example, the resource state indicator of the communication path 1 may be determined by summing resource status indicators of the TNs belonging to the communication path 1. The overall resource state indicator may be expressed by the following equation.

$$R_f(i) = \Sigma W_{ri}(k) R_i(k) \quad \text{[Equation 2]}$$

$R_f(i)$ may indicate the overall resource state indicator. i may indicate an arbitrary communication path. k may indicate an arbitrary TN. $W_{ri}(k)$ may indicate a radio resource weigh of a TN k located in the communication path i.

$R_i(k)$ may indicate a radio resource utilization rate of the TN k included in the communication path i. Specifically, $R_i(k)$ may indicate a ratio of the size of resources occupied by the transmission data unit transmitted through the communication path i with respect to the size of resources of the TN k included in the communication path i.

For example, when it is assumed that the sizes of transmission data units transmitted through the communication path 3 (130-1→130-2→130-5) and the communication path 4 (130-1→130-3→130-5) are the same, if the size of resources of the second TN 130-2 is larger than the size of resources of the third TN 130-3, the resource state indicator of the second TN 130-2 may be smaller than the resource state indicator of the third TN 130-3. The larger the resource state indicator, the lower the transmission performance of the transmission data unit.

The controller 140 may determine the overall channel quality indicator by summing all the channel quality indicators indicating the respective channel states obtained through the plurality of TNs included in the communication path.

The communication path 1 (130-1→130-2→130-4) may include a communication obstacle 160. The communication obstacle 160 may be an obstacle that may interfere with communication such as mountains, forests, and high-rise buildings. The communication obstacle 160 may affect the channel quality indicator indicating the state of the channel. Specifically, the overall channel quality indicator may be expressed by the following equation.

$$C_f(i) = \Sigma C_i(k) \quad \text{[Equation 3]}$$

$C_f(i)$ may indicate the overall channel quality indicator. $C_i(k)$ may indicate a channel state between the TN k included in the communication path i and another TN connected to the TN k and included in the communication path i.

$C_f(i)$ may indicate the overall channel state of the plurality of TNs included in the communication path i. The higher the channel quality indicator, the lower the transmission performance of the transmission data unit.

The communication path 1 (130-1→130-2→130-4) and the communication path 3 (130-1→130-2→130-5) may commonly include the TNs 130-1 and 130-2. The second TN 130-2 may simultaneously transmit and receive a plurality of transmission data units having different destinations.

The communication path 2 (130-1→130-3→130-4), the communication path 4 (130-1→130-3→130-5), and the communication path 5 (130-1→130-3→130-6) may commonly include the third TN 130-3. The third TN 130-3 may simultaneously transmit and receive a plurality of transmission data units having different destinations.

When it is assumed that the sizes of the transmission data units transmitted through the respective communication paths are the same, since the third TN 130-3 transmits and receives three transmission data units having different destinations simultaneously, the third TN 130-3 may have a network state indicator, which indicates a degree of congestion of the communication path, higher than that of the second TN 130-2. Specifically, the network state indicator may be expressed by the following equation.

$$N_f(i) = \Sigma N_t(k) \quad [\text{Equation 4}]$$

$N_f(i)$ may indicate the overall network state indicator. $N_t(k)$ may indicate a buffering state, a network congestion state, and the like that may occur when the TN k included in the communication path i transmits a transmission data unit.

$N_f(i)$ may indicate the network state indicator of the plurality of TNs included in the communication path i. The higher the network state indicator, the lower the transmission performance of the transmission data unit. A communication path efficiency of the communication path i may be expressed by the following equation.

$$\text{Communication path efficiency}(i) = (R_f(i) + C_f(i) + N_f(i)) \quad [\text{Equation 5}]$$

The communication path efficiency of the communication path i may be determined by a sum of the overall resource state indicator, the overall channel quality indicator, and the overall network state indicator of the communication path i. The final communication path may be expressed by the following equation. The lower the value of the communication path efficiency, the higher the transmission performance of the transmission data unit.

$$\text{Final communication path} = \min_l \{\text{communication path efficiency}(l)\} \quad [\text{Equation 6}]$$

The controller 140 may determine a communication path with the minimum communication path efficiency among the plurality of candidate communication paths as the final communication path. l may indicate a communication path with the minimum communication path efficiency among the plurality of candidate communication paths.

The controller 140 may determine a predetermined number of communication paths with low communication path efficiency among the plurality of candidate communication paths as preliminary final communication paths.

The controller 140 may determine the final communication path among the predetermined number of the preliminary final communication paths considering further the service provider information indicating the service priority of the service provider transmitting the transmission data unit. Specifically, the transmission data unit may include the service provider information, and the QoS of the transmission data unit may be determined based on the service provider information.

For example, the controller 140 may determine a final communication path with a communication path efficiency of 1 among the plurality of preliminary final communication paths, if the service priority of the service provider transmitting the transmission data unit is 1.

The controller 140 may determine a final communication path with a communication path efficiency of 2 among the plurality of preliminary final communication paths when the service priority of the carrier transmitting the transmission data unit is 2.

The controller 140 may generate a flow rule that is a rule for transmitting a transmission data unit through a plurality of TNs determined as the final communication path (S706). The flow rule may be a rule for determining the plurality of TNs through which a transmission data unit is transmitted.

If the controller 140 configures the communication path 3 (130-1→130-2→130-5) among the plurality of candidate communication paths as the final communication path, the controller 140 may transmit the flow rule to the TNs 130-1, 130-2, and 130-5 included in the communication path 3 (S707). The TNs 130-1, 130-2 and 130-5 included in the communication path 3 may receive the flow rule from the controller 140 (S707).

The first TN 130-1 included in the communication path 3 receiving the flow rule may transmit the transmission data unit to the second TN 130-2 (S708). The second TN 130-2 having received the transmission data unit from the first TN 130-1 may transmit the transmission data unit to the fifth TN 130-5 (S709).

The fifth TN 130-5 having received the transmission data unit from the second TN 130-2 may transmit the transmission data unit to the second base station 120-2. The second base station 120-2 may transmit the transmission data unit to the second and third terminals 110-2 and 110-3.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a controller in a transport network supporting communications between an access network and a core network, the operation method comprising:
   transmitting a request message for requesting a channel state report to at least one transport node among a plurality of transport nodes included in the transport network;
   receiving, in response to the request message, a response message including channel state information from the at least one transport node;
   determining at least one protocol layer to be used in the at least one transport node based on the channel state information; and transmitting a control message including information on the determined at least one protocol layer to the at least one transport node.

2. The operation method according to claim 1, further comprising receiving a report message including information on a source and a destination of a packet from a first transport node connected to the access network or a second transport node connected to the core network among the plurality of transport nodes, wherein the report message is received before the transmission of the request message.

3. The operation method according to claim 2, wherein the report message further includes a result of a deep packet inspection (DPI) on the packet.

4. The operation method according to claim 2, wherein the first transport node supports at least one communication protocol used by the access network and a common communication protocol used by the transport network, and the second transport node supports at least one communication protocol used by the core network and the common communication protocol.

5. The operation method according to claim 2, further comprising determining a communication path of the packet based on the information included in the report message and the response message, wherein the communication path is determined before the transmission of the control message, and the control message further includes information on the determined communication path.

6. The operation method according to claim 5, wherein the communication path is determined based on a transmission speed and a delay time required for transmission of the packet.

7. The operation method according to claim 1, wherein the at least one protocol layer is determined to be a physical (PHY) layer when a channel state indicated by the channel state information is equal to or larger than a predetermined threshold.

8. The operation method according to claim 1, wherein the at least one protocol layer is determined to be a physical (PHY) layer, a medium access control (MAC) layer, and a radio link control (RLC) layer when a channel state indicated by the channel state information is less than a predetermined threshold.

9. An operation method of a transport node in a transport network supporting communications between an access network and a core network, the operation method comprising:
receiving a request message for requesting a channel state report from a controller controlling the transport network;
measuring a channel state based on the request message;
transmitting a response message including a channel state information including the measure channel state;
receiving, from the controller, a control message indicating at least one protocol layer determined based on the channel state information; and
performing communications using the at least one protocol layer indicated by the control message.

10. The operation method according to claim 9, wherein the control message further includes information on a communication path determined by the controller, and the at least one protocol layer is used for communications with another transport node indicated by the communication path.

11. The operation method according to claim 9, wherein, when a channel state indicated by the channel state information is equal to or larger than a predetermined threshold, the at least one protocol layer is determined to be a physical (PHY) layer, and the communications are performed using the PHY layer.

12. The operation method according to claim 9, wherein, when a channel state indicated by the channel state information is less than a predetermined threshold, a physical (PHY) layer, a medium access control (MAC) layer, and a radio link control (RLC) layer are determined to be the at least one protocol layer, and the communications are performed using the PHY layer, the MAC layer, and the RLC layer.

13. A controller in a transport network supporting communications between an access network and a core network, the controller comprising a processor and a memory storing at least one instruction executed by the processor, wherein the at least one instruction is configured to:
transmit a request message for requesting a channel state report to at least one transport node among a plurality of transport nodes included in the transport network;
receive, in response to the request message, a response message including channel state information from the at least one transport node;
determine at least one protocol layer to be used in the at least one transport node based on the channel state information; and
transmit a control message including information on the determined at least one protocol layer to the at least one transport node.

14. The controller according to claim 13, wherein the at least one instruction is further configure to receive a report message including information on a source and a destination of a packet from a first transport node connected to the access network or a second transport node connected to the core network among the plurality of transport nodes, wherein the report message is received before the transmission of the request message.

15. The controller according to claim 14, wherein the report message further includes a result of a deep packet inspection (DPI) on the packet.

16. The controller according to claim 14, wherein the first transport node supports at least one communication protocol used by the access network and a common communication protocol used by the transport network, and the second transport node supports at least one communication protocol used by the core network and the common communication protocol.

17. The controller according to claim 14, wherein the at least one instruction is further configured to determine a communication path of the packet based on the information included in the report message and the response message, wherein the communication path is determined before the transmission of the control message, and the control message further includes information on the determined communication path.

18. The controller according to claim 17, wherein the communication path is determined based on a transmission speed and a delay time required for transmission of the packet.

19. The controller according to claim 13, wherein the at least one protocol layer is determined to be a physical (PHY) layer when a channel state indicated by the channel state information is equal to or larger than a predetermined threshold.

20. The controller according to claim 13, wherein the at least one protocol layer is determined to be a physical (PHY) layer, a medium access control (MAC) layer, and a radio link control (RLC) layer when a channel state indicated by the channel state information is less than a predetermined threshold.

* * * * *